(12) United States Patent
Luo et al.

(10) Patent No.: US 11,829,650 B2
(45) Date of Patent: Nov. 28, 2023

(54) MEMORY SUB-SYSTEM DATA MIGRATION

(71) Applicant: Micron Technology, Inc., Boise, ID (US)

(72) Inventors: Ting Luo, Santa Clara, CA (US); Xiangang Luo, Fremont, CA (US); Jianmin Huang, San Carlos, CA (US); Phong S. Nguyen, Livermore, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/103,857

(22) Filed: Jan. 31, 2023

(65) Prior Publication Data

US 2023/0176789 A1 Jun. 8, 2023

Related U.S. Application Data

(63) Continuation of application No. 17/395,695, filed on Aug. 6, 2021, now Pat. No. 11,593,032.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 10,120,604 B1 * | 11/2018 | Srinivasan | G06F 12/0868 |
| 10,866,861 B1 * | 12/2020 | Palmer | G06F 3/0679 |
| 2013/0046920 A1 * | 2/2013 | Ryu | G06F 3/0649 |
| | | | 711/E12.008 |
| 2014/0231954 A1 | 8/2014 | Lue | |
| 2016/0179386 A1 | 6/2016 | Zhang | |
| 2018/0285258 A1 * | 10/2018 | Muchherla | G06F 12/0246 |
| 2019/0179698 A1 * | 6/2019 | Liu | G06F 3/0679 |
| 2021/0255803 A1 * | 8/2021 | Kanno | G06F 3/0656 |
| 2022/0028457 A1 * | 1/2022 | Park | G11C 16/32 |
| 2022/0206691 A1 * | 6/2022 | Lee | G06F 3/0614 |
| 2022/0206696 A1 * | 6/2022 | Gao | G06F 3/061 |
| 2022/0206702 A1 * | 6/2022 | Gao | G06F 3/0635 |
| 2022/0214807 A1 * | 7/2022 | Oh | G06F 3/064 |

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Sean D Rossiter
(74) *Attorney, Agent, or Firm* — Brooks, Cameron & Huebsch, PLLC

(57) ABSTRACT

A method includes receiving a command to write data to a memory device and writing the data to a first memory tier of the memory device. The first memory tier of the memory device is a dynamic memory tier that utilizes single level cells (SLCs), multi-level cells (MLCs), and triple level cells (TLCs). The method further includes migrating the data from the first memory tier of the memory device to a second memory tier of the memory device. The second memory tier of the memory device is a static memory tier that utilizes quad level cells (QLCs).

20 Claims, 4 Drawing Sheets

MEMORY SUB-SYSTEM DATA MIGRATION

PRIORITY INFORMATION

This application is a continuation of U.S. application Ser. No. 17/395,695, filed on Aug. 6, 2021, the contents of which are incorporated herein by reference.

TECHNICAL FIELD

Embodiments of the disclosure relate generally to memory sub-systems, and more specifically, relate to memory sub-system data migration.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
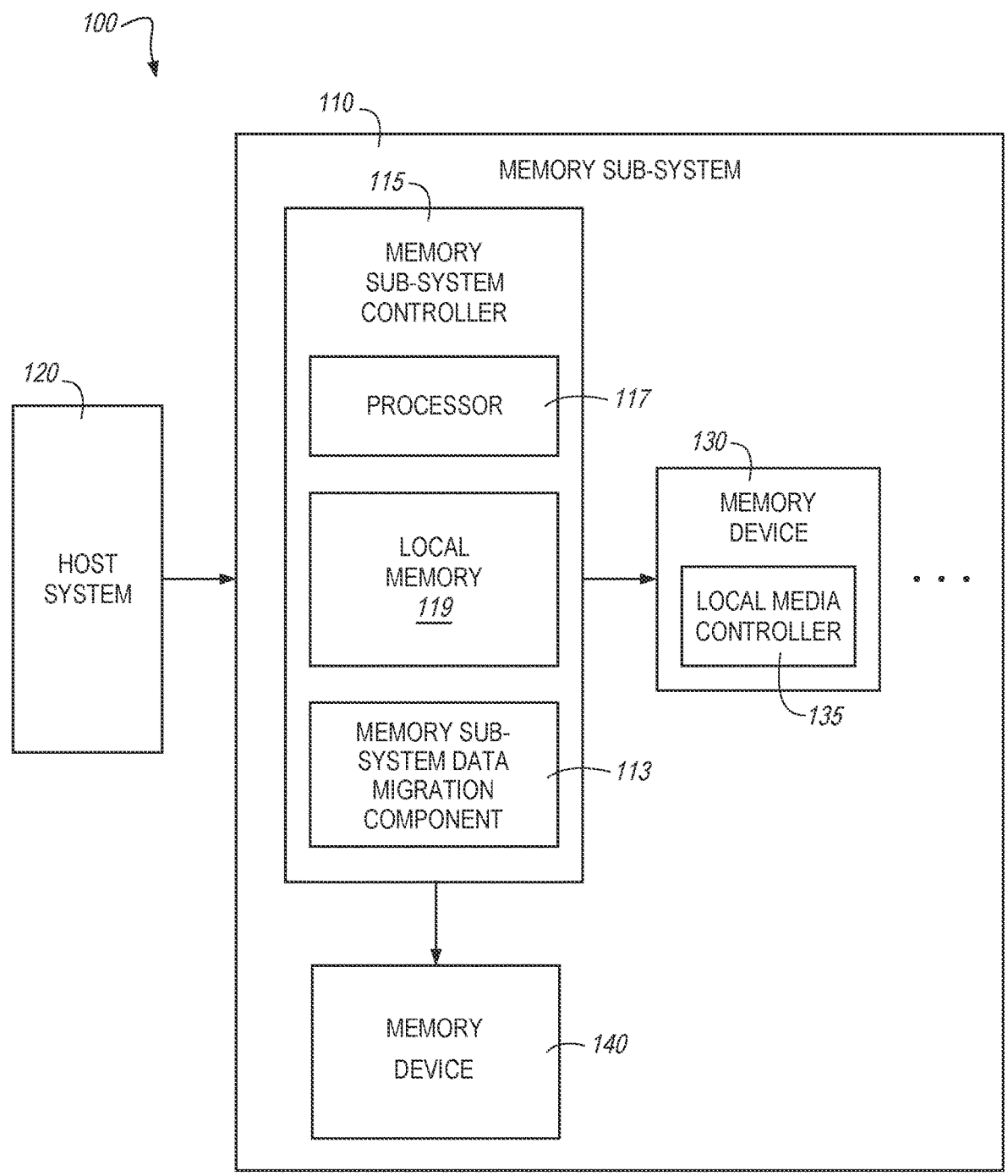
FIG. 1 illustrates an example computing system that includes a memory sub-system in accordance with some embodiments of the present disclosure.

Aspects of the present disclosure are directed to memory sub-system data migration, in particular to memory sub-systems that include a memory sub-system data migration component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Some memory cells (e.g., Flash cells) are capable of being operated (e.g., programed, read, erased, etc.) in a single level cell (SLC) mode, a multi-level cell (MLC) mode, a triple level cell (TLC) mode, and a quad level (QLC) mode (e.g., 1-bit mode, 2-bit mode, 3-bit mode, 4-bit mode, respectively). Such cells can be referred to as "mixed mode" memory cells. Utilizing quad level cells (QLCs) for static storage portions of a memory device can provide higher density memories without increasing the number of memory cells, as compared to memory devices utilizing single level cells (SLCs), multi-level cells (MLCs), and/or triple level cells (TLCs), since each cell can represent comparatively more data.

Utilization of quad-level cells (QLCs) for storage can provide greater storage density per memory cell (e.g., as compared to single level cells (SLCs), multi-level cells (MLCs), and triple level cells (TLCs)). This greater storage density can provide an overall lower quantity of writes per cell count and/or lower cost per unit of memory. While overall lower writes per cell count and/or lower cost per unit of memory can be achieved by utilizing QLCs, utilizing QLCs can result in a lower write performance, a reduced cell life, and/or a lower reliability (e.g., as compared to SLC, MLC, and TLC).

Aspects of the present disclosure address the above and other deficiencies by writing data to a first memory tier of a memory device. In some embodiments, the first memory tier of the memory device can be a dynamic memory tier that utilizes single level cells (SLCs), multi-level cells (MLCs), and triple level cells (TLCs). The data can be migrated from the first memory tier of the memory device to a second memory tier of the memory device. As used herein, the term "data migration," and variants thereof, generally refer to the movement (e.g., writing) of data within a memory sub-system. "Data migration" can include writing data from a portion of the memory sub-system to another portion of the memory sub-system as part of foreground operations and/or background operations. For example, the term "data migration" can refer to writing data from one portion of a memory sub-system to another portion of the memory sub-system in response to host and/or user commands and/or can refer to the movement of data within the memory sub-system as part of background media management operations such as folding operations, wear leveling operations, and/or garbage collections operations, among others. In some embodiments, the second memory tier of the memory device can be a static memory tier that utilizes quad level cells (QLCs). As described in more detail herein, data migration can help eliminate or mitigate the lower write performance associated with QLC and/or reduce effects of extreme wear out conditions, such as wide cross temperatures where the charge on one or more memory cells crosses a read or write boundary due to the temperature experienced by the memory cells.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a data migration component 113. Although not shown in FIG. 1 so as to not obfuscate the drawings, the data migration component 113 can include various circuitry to facilitate receiving a command to write data for a memory sub-system and/or components of the memory sub-system, writing the data to a first memory tier of the memory device; wherein the first memory tier of the memory device is a dynamic memory tier that utilizes single level cells (SLCs), multi-level cells (MLCs), and triple level cells (TLCs) of the memory sub-system and/or components of the memory sub-system, and/or migrating the data from the first memory tier of the memory device to a second memory tier of the memory device; wherein second memory tier of the memory device is a static memory tier that utilizes quad level cells (QLCs) for the memory sub-system and/or the components of the memory sub-system. In some embodiments, the data migration component 113 can include special purpose circuitry in the form of an ASIC, FPGA, state machine, and/or other logic circuitry that can allow the data migration component 113 to orchestrate and/or perform operations to selectively perform data migrating operations for the memory device 130 and/or the memory device 140, where the data is migrated from the dynamic memory tier to the static memory tier.

In some embodiments, the memory sub-system controller 115 includes at least a portion of the data migration component 113. For example, the memory sub-system controller 115 can include a processor 117 (processing device) configured to execute instructions stored in local memory 119 for performing the operations described herein. In some embodiments, the data migration component 113 is part of the host system 110, an application, or an operating system.

In some embodiments, the memory sub-system 110, and hence the data migration component 113, the processor 119, and the memory devices 130/140, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

In a non-limiting example, an apparatus (e.g., the computing system 100) can include a memory sub-system data migration component 113, which, for brevity, can be referred to herein as a "data migration component." The memory sub-system data migration component 113 can be resident on the memory sub-system 110. As used herein, the term "resident on" refers to something that is physically located on a particular component. For example, the memory sub-system data migration component 113 being "resident on" the memory sub-system 110 refers to a condition in which the hardware circuitry that comprises the memory sub-system data migration component 113 is physically located on the memory sub-system 110. The term "resident on" can be used interchangeably with other terms such as "deployed on" or "located on," herein.

The memory sub-system data migration component 113 can be configured to receive a command to write data to a memory component of the memory sub-system, write the data to a dynamic memory tier that utilizes single level cells (SLCs), multi-level cells (MLCs), and triple level cells (TLCs), and migrate the data from the dynamic memory tier to a static memory tier that utilizes quad level cells (QLCs). As described above, the memory components can be memory dice or memory packages that form at least a portion of the memory device 130 and/or the memory device 140. As used herein "memory tier" refers to a portion of a memory device.

The memory sub-system data migration component 113 that can be further configured to abort the migration of data from the dynamic memory tier to the static memory tier when the static memory tier reaches a threshold static memory tier fill level, as discussed further herein. In some embodiments, the memory sub-system data migration component 113 can periodically migrate data from the dynamic memory tier to the static memory tier. As an example, the memory sub-system data migration component 113 can migrate data from the dynamic memory tier to the static memory tier within a particular time range, as discussed further herein.

Figure 2:
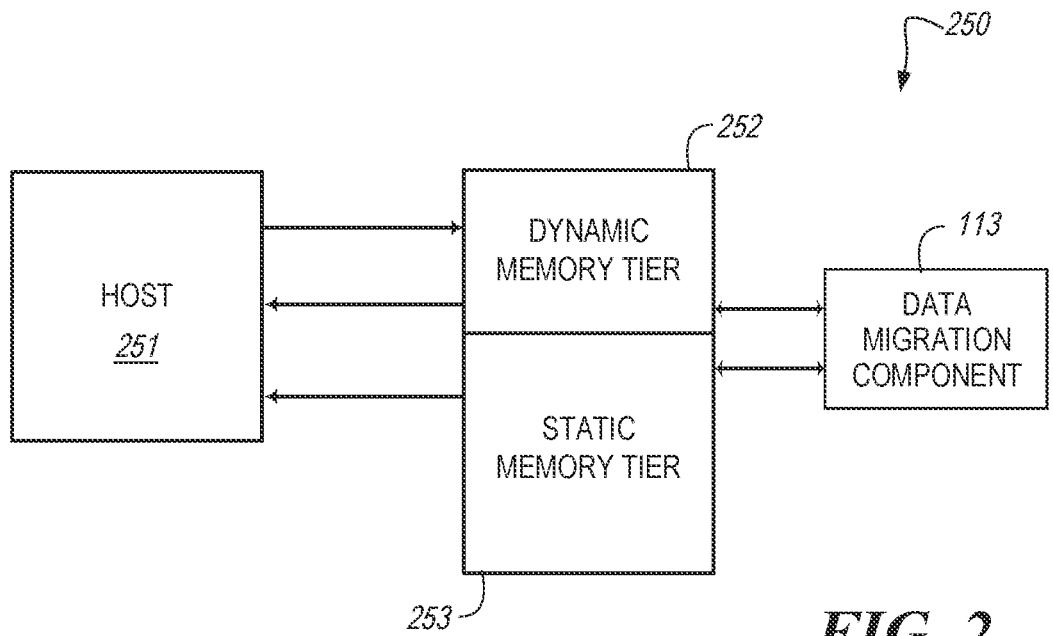
FIG. 2 is a block diagram of a portion of a memory sub-system in accordance with some embodiments of the present disclosure.

FIG. 2 is a block diagram of a portion of a memory sub-system 250 in accordance with some embodiments of the present disclosure. As shown in FIG. 2, the memory sub-system 250 can include a host 251, a dynamic memory tier 252, and a static memory tier 253, and a data migration component 113, which can be analogous to the memory sub-system data migration component 113 illustrated in FIG. 1.

The dynamic memory tier 252 includes a number of "dynamic memory cells" or "dynamic blocks." As used herein, "dynamic memory cells" or "dynamic blocks" generally refer to memory cells that can be allocated to a plurality of different sizes and re-allocated to different sizes once allocated. For example, different portions of memory can be dynamically increased and/or decreased in size as conditions and/or demands on the memory are increased and/or decreased.

As mentioned, the dynamic memory tier 252 utilizes single level cells (SLCs), multi-level cells (MLCs), and triple level cells (TLCs). Embodiment of the present disclosure provide that the utilization of SLCs, the utilization of MLCs, and the utilization of TLCs can be allocated to a plurality of different sizes and re-allocated to different sizes after initial allocation or after being re-allocated. In other words, while the dynamic memory tier 252 is itself dynamic, the SLC, MLC, and TCL portions of the dynamic memory tier 252 are each respectively and independently dynamic.

A controller (e.g., the data migration component 113 and/or the memory sub-system controller 115) can be configured to variously utilize the SLCs, MLCs, and TLCs (e.g., as various conditions and/or various applications are encountered). SLCs are written to the dynamic memory tier 252 in a SLC mode; MLCs are written to the dynamic memory tier 252 in an MLC mode; and TLCs are written to the dynamic memory tier 252 in an TLC mode. As the dynamic memory tier 252 is dynamic, resizing of the dynamic memory tier 252 (e.g., a number of blocks utilized) and/or sets of memory cells associated therewith thereof (e.g., SLCs, MLCs, and TLCs) may be changed during operation (e.g., during runtime of the memory sub-system and/or during runtime of an operating system executed by the host 251, i.e., "on the fly") to accommodate various demands on the memory. One or more embodiments provide that different portions of memory can be utilized as the dynamic memory tier 252. For example, different portions of memory (e.g., different portions of the memory devices 130 and 140 illustrated in FIG. 1) can be dynamically increased and/or decreased in size as demands on the memory are increased and/or decreased.

One or more embodiments provide that the utilization of SLCs of the dynamic memory tier 252 may be increased, as compared to utilization of MLCs and TLCs, when relatively greatest write speeds, relatively lowest power consumption, and/or relatively greatest cell endurance are desired, for instance. One or more embodiments provide that the utilization of MLCs of the dynamic memory tier 252 may be increased, as compared to utilization of SLCs and TLCs, when relatively intermediate write speeds, relatively intermediate power consumption, and/or relatively intermediate cell endurance are desired, for instance. One or more embodiments provide that the utilization of TLCs of the dynamic memory tier 252 may be increased, as compared to utilization of SLCs and TLCs, when relatively intermediate write speeds, relatively intermediate power consumption, and/or relatively intermediate cell endurance are desired, for instance.

The static memory tier 253 includes a number of "static memory cells" or "static blocks." As used herein, "static memory cells" or "static blocks" generally refer to sets or groups of memory cells within a block that are fixed in size once allocated to the size. For example, static portions of memory are not increased and/or decreased in size as conditions and/or demands on the memory are increased and/or decreased.

As mentioned, the static memory tier 253 utilizes quad level cells (QLCs). As the static memory tier 253 is static, the static memory tier 253 is not resized during operation in view of various demands on the memory. QLCs are written to the static memory tier 253 in a QLC mode. Utilization of QLCs for the static memory tier 253 can provide a relatively higher density, as compared memory tiers utilizing SLCs, MLCs, and/or TLCs. However, QLCs may provide lower write performance associated with QLC and/or reduce effects of extreme wear out conditions, such as wide cross temperatures, as compared to SLCs, MLCs, and/or TLCs. As mentioned, aspects of the present disclosure provide writing the data to a first memory tier (e.g., dynamic memory tier 252) and migrating the data from the first memory tier a second memory (e.g., static memory tier 253). One or more embodiments provide that migrating the data from the first memory tier the second memory may occur independently of any direct host interaction.

One or more embodiments provide that data can be periodically migrated from the dynamic memory tier 252 to the static memory tier 253. As an example, the memory sub-system data migration component 113 can migrate data from the dynamic memory tier to the static memory tier within a time range of 3 hours to 48 hours, among other times. For instance, data can be migrated from the dynamic memory tier 252 to the static memory tier 253 after a 3-hour interval (e.g., 3 hours after a previous data migration from the dynamic memory tier 252 to the static memory tier 253), after a 4-hour interval, after a 6-hour interval, after an 8-hour interval, after a 12-hour interval, after an 18-hour interval, after a 24-hour interval, after a 36-hour interval, and/or after a 48-hour interval. One or more embodiments provide that migrating the data from the first memory tier the second memory may occur independently of any direct host interaction.

One or more embodiments provide that data can be migrated from the dynamic memory tier 252 to the static memory tier 253 when the dynamic memory tier 252 reaches a threshold dynamic memory tier fill level. The threshold dynamic memory tier fill level can have different values for various applications. For instance, data can be migrated from the dynamic memory tier 252 to the static memory tier 253 when the dynamic memory tier 252 is completely filled (indicating a threshold dynamic memory tier fill level of 100%), when the dynamic memory tier 252 is 99% filled based upon a total memory space of the dynamic memory tier 252 (indicating a threshold dynamic memory tier fill level of 99%), when the dynamic memory tier 252 is 97% filled based upon a total memory space of the dynamic memory tier 252 (indicating a threshold dynamic memory tier fill level of 97%), or when the dynamic memory tier 252 is 95% filled based upon a total memory space of the dynamic memory tier 252 (indicating a threshold dynamic memory tier fill level of 95%), among other values.

One or more embodiments provide that data can be migrated from the dynamic memory tier 252 to the static memory tier 253 during an idle time (e.g., an idle time of the apparatus). As used herein, an "idle time" generally refers to a time during which host operations are not being performed with respect to the memory device and therefore during a time in which an interface coupling the host to the memory subsystem is not transferring commands or otherwise being encumbered. The term "idle time" can be used interchangeably with the terms "background operation" or "in the background," as appropriate given the context. Data can be migrated from the dynamic memory tier 252 to the static memory tier 253 as a background media management operation (e.g., when the host is not utilizing the interface associated with the memory sub-system).

One or more embodiments provide that data can be migrated from the dynamic memory tier 252 to the static memory tier 253 when the system has been idle for a threshold idle time interval. The threshold idle time interval can have different values for various applications. As an example, data can be migrated from the dynamic memory tier 252 to the static memory tier 253 when the system has been idle for a threshold idle time interval of 1 minute, 5 minutes, 10 minutes, 15 minutes, 30 minutes, or 60 minutes, among other values.

One or more embodiments provide that data written in a SLC mode to the dynamic memory tier 252 is migrated to the static memory tier 253 prior to migrating data written in a MLC mode or a TLC mode to the static memory tier 253. One or more embodiments provide that data written in a MLC mode to the dynamic memory tier 252 is migrated to the static memory tier 253 prior to migrating data written in a SLC mode or a TLC mode to the static memory tier 253. One or more embodiments provide that data written in a TLC mode to the dynamic memory tier 252 is migrated to the static memory tier 253 prior to migrating data written in a SLC mode or a MLC mode to the static memory tier 253.

One or more embodiments provide that data written to the dynamic memory tier 252 is migrated to the static memory tier 253 in an order (e.g., a consecutive order) that the data was written to the dynamic memory tier 252. For example, data that is written relatively earlier to the dynamic memory tier 252 can be migrated to the static memory tier 253 prior to data that is written relatively later to the dynamic memory tier 252. Accordingly, embodiments herein contemplate scenarios in which the data written to the dynamic memory tier 252 is migrated to the static memory tier 253 according to a first-in first-out (FIFO) policy. Embodiments are not so limited, however, and data written to the dynamic memory tier 252 can be migrated to the static memory tier 253 according to a last-in first-out (LIFO) policy and/or according to policies in which particular data are prioritized for migration according to characteristics associated therewith.

One or more embodiments provide that migration of data from the dynamic memory tier 252 to the static memory tier 253 can be aborted (e.g., stopped) when the static memory tier 253 reaches a threshold static memory tier fill level. The threshold static memory tier fill level can have different values for various applications. For instance, migration of data from the dynamic memory tier 252 to the static memory tier 253 can be aborted when the static memory tier has zero available memory space, 1% available memory space based upon a total memory space of the static memory tier, 3% available memory space based upon a total memory space of the static memory tier, or 5% available memory space based upon a total memory space of the static memory tier, among other whole number or fractional values. One or more embodiments provide that migration of data from the dynamic memory tier 252 to the static memory tier 253 may be resumed (e.g., subsequently to the migration being aborted) when the static memory tier 253 no longer reaches the threshold static memory tier fill level (e.g., following an erase operation).

As shown by the arrows in FIG. 2, data can be written from the host 251 to the dynamic memory tier 252. FIG. 2 further shows that data can be accessed by the host 251 from both the dynamic memory tier 252 and the static memory tier 253. For instance, subsequently to data being migrated from the dynamic memory tier 252 to the static memory tier 253 the data can be accessed from the static memory tier 253. However, data that is written to the dynamic memory tier 252 may be accessed from the dynamic memory tier 252 (e.g., prior to the data being migrated from the dynamic memory tier 252 to the static memory tier 253). One or more embodiments provide that data cannot be written directly from the host 251 to the static memory tier 253.

One or more embodiments provide that sequential data, such as pictures, video, and/or audio, for instance, can be written from the host 251 to the dynamic memory tier 252 in an SLC mode while non-sequential data can be written from the host 251 to the dynamic memory tier 252 in a MLC mode or a TLC mode. In general, sequential data is written to sequential memory cells of the memory device (e.g., physically contiguous sectors of the memory tier) while non-sequential data is written to memory cells that are scattered throughout the memory device (e.g., data that is written to non-contiguous physical sectors of a memory tier). One or more embodiments provide that data that can be directly written to the static memory tier 253 (e.g., the dynamic memory tier 252 may be bypassed) when the dynamic memory tier 252 is full.

One or more embodiments provide that data that is written to the dynamic memory tier 252 may be accessed from the dynamic memory tier 252 subsequently to the data being migrated to the static memory tier 253 (e.g., prior to the data being erased from the dynamic memory tier 252). Accessing data from the dynamic memory tier 252 subsequently to the data being migrated to the static memory tier 253 can provide a relatively faster access (e.g., as compared to accessing the data from the static memory tier 253) and/or can provide a relatively lower error probability and/or lower raw bit error rate (e.g., as compared to accessing the data from the static memory tier 253).

Figure 3:
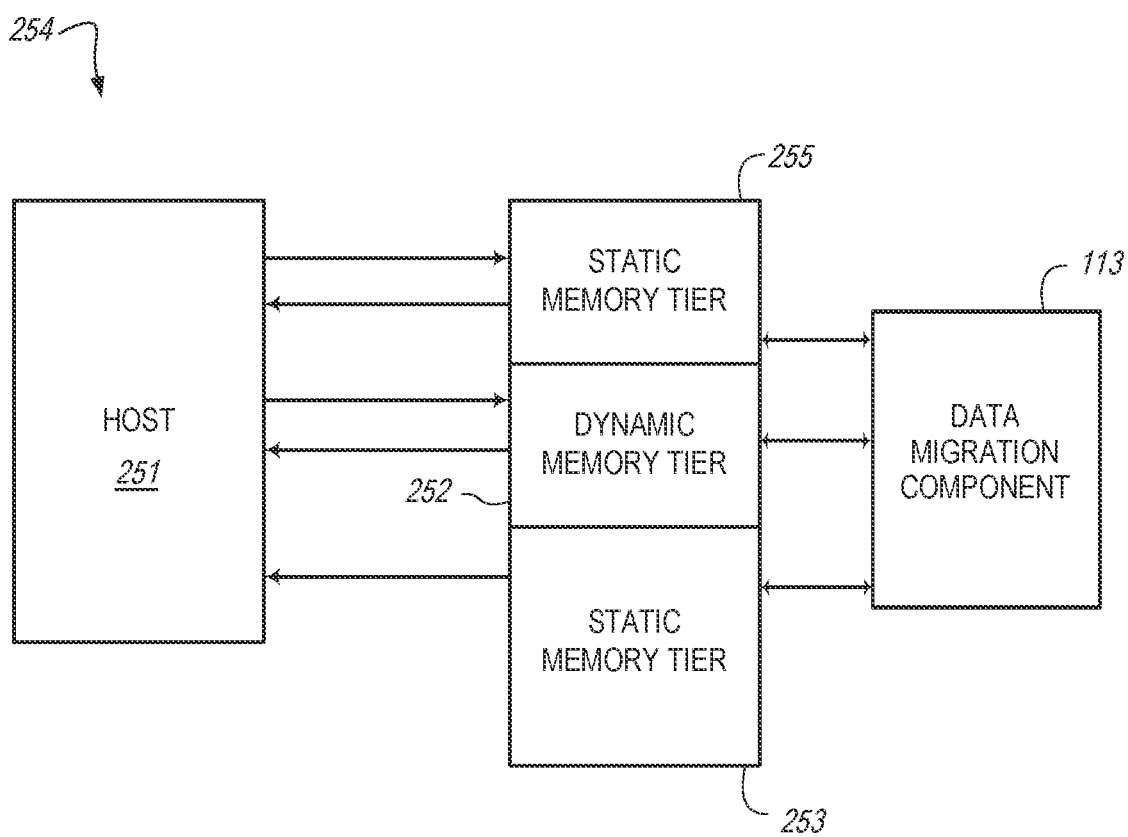
FIG. 3 is a block diagram of a portion of a memory sub-system in accordance with some embodiments of the present disclosure.

FIG. 3 is a block diagram of a portion of a memory sub-system 254 in accordance with some embodiments of the present disclosure. As shown in FIG. 0.3, the memory sub-system 254 can include a host 251, a static memory tier 255 (e.g., a third memory tier), a dynamic memory tier 252 (e.g., as discussed with FIG. 2), and a static memory tier 253 (e.g., as discussed with FIG. 2).

One or more embodiments provide that the static memory tier 255 utilizes single level cells (SLCs). As the static memory tier 255 is static, the static memory tier 255 is not resized during operation in view of various demands on the memory. Data are written to the static memory tier 255 in a SLC mode. The static memory tier 255 may have different sizes (e.g., include differing numbers of memory cells) for various applications. One or more embodiments provide that the static memory tier 255 utilizes fewer memory cells than the dynamic memory tier 252. One or more embodiments provide that the static memory tier 255 utilizes more memory cells than the dynamic memory tier 252. One or more embodiments provide that the static memory tier 255 utilizes an equal number of memory cells as the dynamic memory tier 252. Embodiments of the present disclosure provide that data can be migrated from the static memory tier 255 to the static memory tier 253, the dynamic memory tier 252, or both.

One or more embodiments provide that data can be periodically migrated from the static memory tier 255 to the static memory tier 253 and/or the dynamic memory tier 252. As an example, the memory sub-system data migration component 113 can migrate data from the static memory tier 255 to the static memory tier 253 and/or the dynamic memory tier 252 within a time range of 3 hours to 48 hours, among other times. For instance, data can be migrated from the static memory tier 255 to the static memory tier 253 after a 3-hour interval (e.g., 3 hours after a previous data migration from the static memory tier 255 to the static memory tier 253 and/or the dynamic memory tier 252), after a 4-hour interval, after a 6-hour interval, after an 8-hour interval, after a 12-hour interval, after an 18-hour interval, after a 24-hour interval, after a 36-hour interval, and/or after a 48-hour interval and/or other whole number or fractional temporal interval values.

One or more embodiments provide that data can be migrated from static memory tier 255 to the static memory tier 253 and/or the dynamic memory tier 252 when the static memory tier 255 reaches a threshold static memory tier fill level. The threshold static memory tier fill level can have different values for various applications. For instance, data can be migrated from the static memory tier 255 to the static memory tier 253 and/or the dynamic memory tier 252 when the static memory tier 255 is completely filled (indicating a threshold static memory tier fill level of 100%), when the static memory tier 255 is 99% filled based upon a total memory space of the static memory tier 255 (indicating a threshold static memory tier fill level of 99%), when the static memory tier 255 is 97% filled based upon a total memory space of the static memory tier 255 (indicating a threshold static memory tier fill level of 97%), or when the static memory tier 255 is 95% filled based upon a total memory space of the static memory tier 255 (indicating a threshold static memory tier fill level of 95%), among other whole number or fractional values.

One or more embodiments provide that data can be migrated from the static memory tier 255 to the static memory tier 253 and/or the dynamic memory tier 252 during an idle time (e.g., an idle time of the apparatus, host, memory sub-system, or components thereof). Data can be migrated from the static memory tier 255 to the static memory tier 253 and/or the dynamic memory tier 252 as a background media management operation (e.g., when the host is not utilizing the interface associated with the memory sub-system).

One or more embodiments provide that data can be migrated from the static memory tier 255 to the static memory tier 253 and/or the dynamic memory tier 252 when the system has been idle for a threshold idle time interval. The threshold idle time interval may have different values for various applications. As an example, data can be migrated from the static memory tier 255 to the static memory tier 253 and/or the dynamic memory tier 252 when the system has been idle for a threshold idle time interval of 1 minute, 5 minutes, 10 minutes, 15 minutes, 30 minutes, or 60 minutes, among other whole number or fractional values.

One or more embodiments provide that data written in a SLC mode to the static memory tier 255 is migrated to the static memory tier 253 prior to migrating data written to the dynamic memory tier 252 to the static memory tier 253. One or more embodiments provide that data written in a SLC mode to the static memory tier 255 is migrated to the static memory tier 253 subsequent to migrating data written to the dynamic memory tier 252 to the static memory tier 253. One or more embodiments provide that data written in a SLC mode to the static memory tier 255 is migrated to the static memory tier 253 subsequent to migrating data written in a SLC mode to the dynamic memory tier 252 to the static memory tier 253, but prior to migrating data written in a MLC mode or a TLC mode to the dynamic memory tier 252 to the static memory tier 253.

As shown by the arrows in FIG. 3, data can be written from the host 251 to the dynamic memory tier 252 and/or the static memory tier 255. FIG. 3 further shows that data can be accessed by the host 251 from each of the dynamic memory tier 252, the static memory tier 255, and the static memory tier 253. For instance, subsequently to data being migrated from the static memory tier 255 to the static memory tier 253 the data can be accessed from the static memory tier 253. However, data that is written to the static memory tier 255 can be accessed from the static memory tier 255 prior to the data being migrated from the static memory tier 255 to the static memory tier 253. One or more embodiments provide that data cannot be written directly from the host 251 to the static memory tier 253.

One or more embodiments provide that data that is written to the static memory tier 255 can be accessed from the static memory tier 255 subsequently to the data being migrated to the static memory tier 253 (e.g., prior to the data being erased from the static memory tier 255). Accessing data from the static memory tier 255 subsequently to the data being migrated to the static memory tier 253 can provide a relatively faster access (e.g., as compared to accessing the data from the static memory tier 253) and/or provide a relatively lower error probability or raw bit error rate (e.g., as compared to accessing the data from the static memory tier 253).

Figure 4:
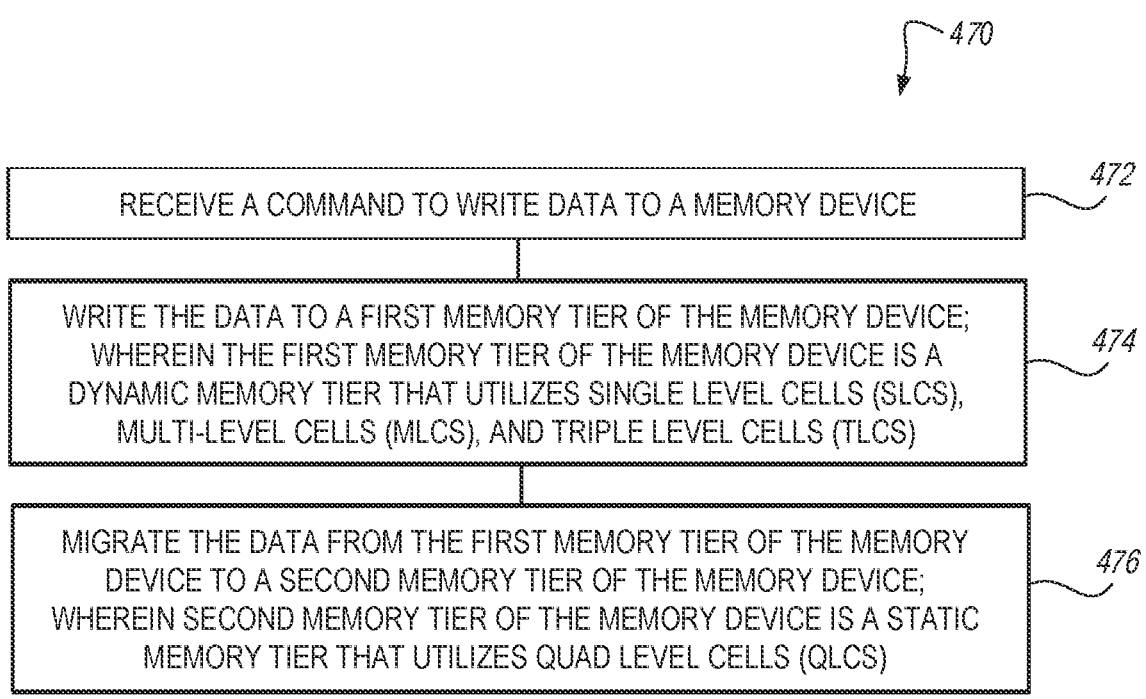
FIG. 4 is flow diagram corresponding to a method for data migration in accordance with some embodiments of the present disclosure.

FIG. 4 is flow diagram corresponding to a method 470 for data migration in accordance with some embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by the data migration component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 472, a command to write data to a memory device can be received. In some embodiments, the memory device can be analogous to the memory device 130 illustrated in FIG. 1. As described above, the memory components can be memory dice or memory packages that are coupled to one another to create an array of memory cells, such as a three-dimensional stackable cross-gridded array of memory cells used by the memory sub-system to store data.

At operation 474, the data can be written to a first memory tier of the memory device. Embodiments provide that the first memory tier of the memory device is a dynamic memory tier that utilizes single level cells (SLCs), multi-level cells (MLCs), and triple level cells (TLCs).

At operation 476, the data can be migrated from the first memory tier of the memory device to a second memory tier of the memory device. Embodiments provide that second memory tier of the memory device is a static memory tier that utilizes quad level cells (QLCs).

In some embodiments, the method 470 can include that the data is migrated from the first memory tier of the memory device to the second memory tier of the memory device periodically. As an example, the data can be migrated from the first memory tier of the memory device to the second memory tier of the memory device within a range of 3 hours to 48 hours, among other values.

In some embodiments, the method 470 can include that the data is migrated from the first memory tier of the memory device to the second memory tier of the memory device when the first memory tier of the memory device reaches a threshold first memory tier fill level.

In some embodiments, the method 470 can include that the data migration from the first memory tier of the memory device to the second memory tier of the memory device is aborted when the second memory tier of the memory device reaches a threshold second memory tier fill level.

In some embodiments, the method 470 can include that the data is accessed from the first memory tier of the memory device prior to migrating the data from the first memory tier of the memory device to the second memory tier of the memory device.

Figure 5:
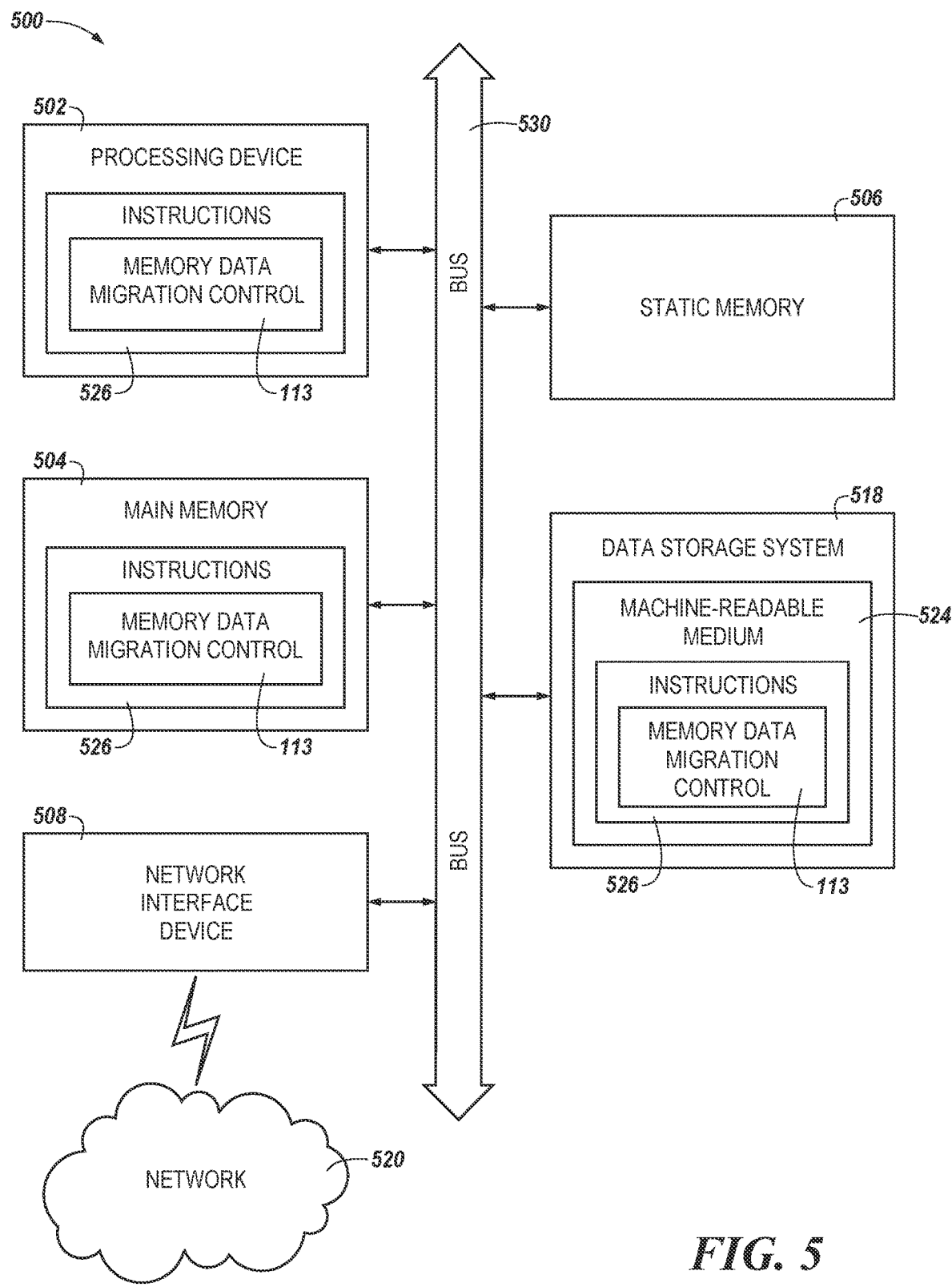
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data migration component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a data migration component (e.g., the data migration component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
 writing first data, second data, and third data to a dynamic tier of a memory device utilizing a single level cell (SLC) mode for the first data, a multi-level cell (MLC) mode for the second data, and a triple level cell (TLC) mode for the third data; wherein the dynamic tier of the memory device utilizes SLCs, MLCs, and TLCs; and
 migrating the first data, the second data, and the third data from the dynamic tier of the memory device to a static tier of the memory device that utilizes quad level cells (QLCs).

2. The method of claim 1, wherein migrating the data from the dynamic tier of the memory device to the static tier of the memory device is performed periodically.

3. The method of claim 2, wherein periodically migrating the data from the dynamic tier of the memory device to the static tier of the memory device occurs within a range of 3 hours to 48 hours.

4. The method of claim 1, wherein migrating the data from the dynamic tier of the memory device to the static tier of the memory device is performed when the dynamic tier of the memory device reaches a threshold dynamic tier fill level.

5. The method of claim 1, further comprising aborting the migration of data from the dynamic tier of the memory device to the static tier of the memory device when the static tier of the memory device reaches a threshold static tier fill level.

6. The method of claim 1, further comprising accessing the data from the dynamic tier of the memory device prior to migrating the data from the dynamic tier of the memory device to the static tier of the memory device.

7. An apparatus, comprising:
a memory device; and
a controller coupled to the memory device and configured to:
write first data, second data, and third data to a dynamic tier of a memory device utilizing a single level cell (SLC) mode for the first data, a multi-level cell (MLC) mode for the second data, and a triple level cell (TLC) mode for the third data; wherein the dynamic tier of the memory device utilizes SLCs, MLCs, and TLCs; and
migrate the first data, the second data, and the third data from the dynamic tier of the memory device to a static tier of the memory device that utilizes quad level cells (QLCs).

8. The apparatus of claim 7, wherein the dynamic tier of the memory device that utilizes single level cells (SLCs), multi-level cells (MLCs), and triple level cells (TLCs) is a first memory tier of the memory device and the static memory tier is a second memory tier of the memory device.

9. The apparatus of claim 8, wherein the controller is configured to: write the first data, the second data, and the third data to a third memory tier of the memory device; wherein the third memory tier of the memory device is a static memory tier that utilizes single level cells (SLCs).

10. The apparatus of claim 9, wherein the second memory tier of the memory device includes a greater number of memory cells than the third memory tier of the memory device.

11. The apparatus of claim 9, wherein the controller is configured to migrate the data written to the third memory tier of the memory device to the second memory tier of the memory device or the first memory tier of the memory device, or both.

12. The apparatus of claim 7, wherein the apparatus is a mobile computing device.

13. The apparatus of claim 7, wherein the controller is configured to migrate the data from the dynamic tier of the memory device to the static tier of the memory device during idle time of the apparatus.

14. A non-transitory computer-readable storage medium comprising instructions that, when executed by a processing device, cause the processing device to:
write first data, second data, and third data to a first memory tier of the at least one of the plurality of memory components utilizing a single level cell (SLC) mode for the first data, a multi-level cell (MLC) mode for the second data, and a triple level cell (TLC) mode for the third data; wherein the first memory tier is a dynamic memory tier of the at least one of the plurality of memory components that utilizes single level cells (SLCs), multi-level cells (MLCs), and triple level cells (TLCs); and
relocate the first data, the second data, and the third data from the first memory tier of the at least one of the plurality of memory components to a second memory tier of the at least one of the plurality of memory components; wherein the second memory tier is a static memory tier of the at least one of the plurality of memory components that utilizes quad level cells (QLCs).

15. The medium of claim 14, wherein the instructions are executable by the processing device to cause the processing device to: access the data from the first memory tier of the at least one of the plurality of memory components prior to relocating the data from the first memory tier of the at least one of the plurality of memory components to the second memory tier of the at least one of the plurality of memory components.

16. The medium of claim 15, wherein the instructions are executable by the processing device to cause the processing device to: access the data from the second memory tier of the at least one of the plurality of memory components after relocating the data from the first memory tier of the at least one of the plurality of memory components to the second memory tier of the at least one of the plurality of memory components.

17. The medium of claim 14, wherein the instructions are executable by the processing device to cause the processing device to: receive a host command to write the first data, the second data, and the third data, wherein the data comprises sequential data that is written to single level cells (SLCs) of the first memory tier.

18. The medium of claim 14, wherein the instructions are executable by the processing device to cause the processing device to: relocate the first data, the second data, or the third data, or any combination thereof periodically.

19. The medium of claim 14, wherein the instructions are executable by the processing device to cause the processing device to: relocate the first data, the second data, or the third data, or any combination thereof when the first memory tier of the at least one of the plurality of memory components reaches a threshold first memory tier fill level.

20. The medium of claim 14, wherein the instructions are executable by the processing device to cause the processing device to: relocate the first data, the second data, or the third data, or any combination thereof when the system has been idle for a threshold idle time interval.

* * * * *